Nov. 23, 1954
G. A. BRUNDRETT
2,695,079
HYDRAULIC SHOCK ABSORBER
Filed March 8, 1952
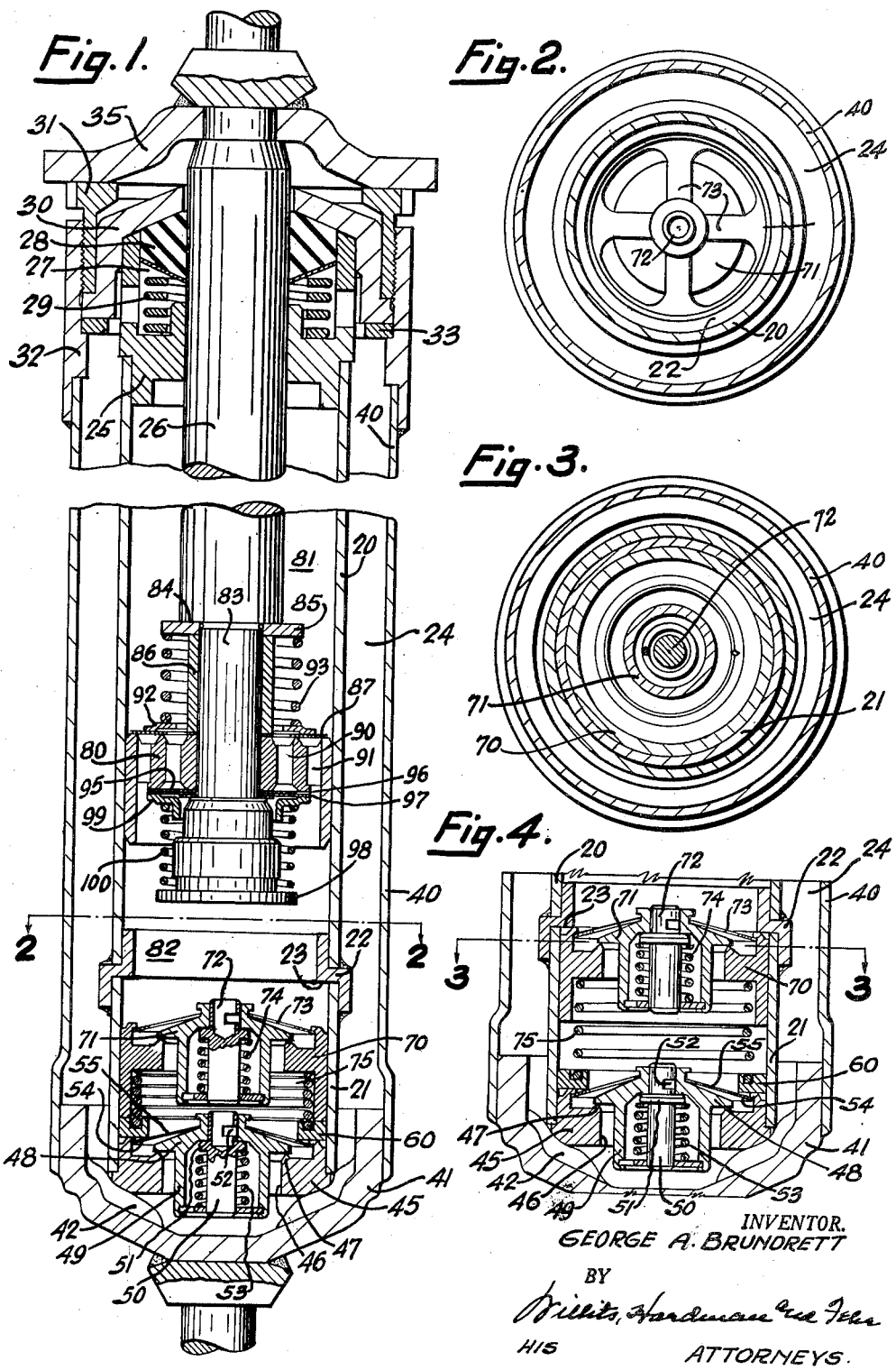
INVENTOR.
GEORGE A. BRUNDRETT
BY
HIS ATTORNEYS.

United States Patent Office 2,695,079
Patented Nov. 23, 1954

2,695,079

HYDRAULIC SHOCK ABSORBER

George A. Brundrett, Dayton, Ohio, assignor to General Motors Corporation, Detroit, Mich., a corporation of Delaware Application March 8, 1952, Serial No. 275,577

13 Claims. (Cl. 188—88)

This invention relates to an improved hydraulic shock absorber.

It is among the objects of the present invention to provide a double acting hydraulic shock absorber of the direct acting type with fluid flow control mechanism operative to cause the shock absorber to provide a predetermined resistance to movement within a certain range of its cycle of operation and a predetermined greater degree of resistance during the remaining portion of its cycle of operation.

Further objects and advantages of the present invention will be apparent from the following description, reference being had to the accompanying drawing wherein a preferred embodiment of the present invention is clearly shown.

In the drawing:

Fig. 1 is a longitudinal sectional view of a direct acting type hydraulic shock absorber equipped with the present invention.

Fig. 2 is a transverse sectional view taken along the line and in the direction of the arrows 2—2 in Fig. 1.

Fig. 3 is a similar sectional view taken along the line and in the direction of the arrows 3—3 in Fig. 4.

Fig. 4 is a fragmentary sectional view taken from Fig. 1 and showing a movable part of the device in a different position.

Referring to the drawing, the shock absorber consists of a cylinder made up of two, equal diameter portions 20 and 21 secured together in coaxial alignment by a coupling ring 22 which provides abutment 23 within the cylinder. At one end of said cylinder portion 20 there is provided a closure member forming a rod guide 25 in which rod 26 is slidably supported. One end of the rod guide 25 telescopically fits into the cylinder 20 while the other end is recessed to form a chamber 27 in which the packing 28 is contained. A spring 29 seated on the bottom of chamber 27 urges the packing 28 into sealing engagement with the interior wall surface of said recess 27 and with the interior surface of a cup-shaped cap 30, fitting upon and about the recessed end of the rod guide 25, said cap being centrally apertured to permit the rod 26 to extend therethrough to the exterior of the shock absorber. An exteriorly threaded collar 31 fits about the cap 30 and seats upon an outwardly extending, annular flange on said cap. One end of a sleeve 32 is threaded to collar 31, said sleeve having an inwardly extending, annular flange providing a shoulder upon which a sealing ring 33 is pressed by the cap 30, rigidly held in this ring clamping position in sleeve 32 by the collar 31. The end of rod 26, extending outside the shock absorber has a disc 35 secured thereto which, when the shock absorber is fully collapsed as shown in Fig. 1, engages the collar 31.

The sleeve 32 has one end of a tube 40 attached thereto, preferably by welding, the other end of said tube being provided with a cup-shaped cover cap 41. This tube provides an annular chamber around the cylinders 20 and 21 which forms the fluid reservoir 24. Inside this cover cap 41 there are several, spaced ribs 42, upon which rests the end closure member 45 in the form of a valve cage telescopically fitting into and seating upon the end of the cylinder portion 21. This valve cage 45 and its oppositely acting valves is of the type forming the subject matter of the Patent 2,583,169, issued to Mearick Funkhouser on January 22, 1952. The valve-cage 45 has a central opening 46 surrounded by a ridge forming a valve-seat 47 on the side of the cage adjacent the interior of the cylinder 21. A disc-valve 48, termed the "intake valve," engages valve-seat 47 to close opening 46, said disc-valve having a cylindrical extension 49 of lesser diameter than opening 46 extending through said opening. A central opening in the disc-valve 48 slidably receives the recessed end of a plug type, pressure relief valve 50, an outwardly extending, annular flange 51 on said plug valve engaging the inner side of said disc-valve to close the central opening therein. A slot 52 in the side wall of the recessed end of the plug valve 50, normally within the confines of the disc-valve opening, is adapted to open restricted communication between the two sides of the disc-valve 48 when said plug valve is moved outwardly relatively to said disc-valve a predetermined distance. A spring 53, interposed between the plug-valve 50 and a perforated abutment plate secured within the cylindrical extension 49, yieldably maintains the flange 51 of said plug-valve in engagement with the disc-valve 48. A ring shaped member 54, with radial spring fingers 55, is secured to the inner side of the valve-cage 45, the fingers 55 engaging the disc-valve and yieldably maintaining it upon valve-seat 47. The free ends of the spring fingers 55 are in juxtaposition to a cylindrical extension on the disc valve and thereby maintain said disc-valve in proper axial alignment with the seat 47. A ring 60 fitting within the cylinder 21 and resting upon the valve-cage 45 has an annular, spring receiving groove in its surface opposite the valve-cage.

An unattached piston 70 is reciprocative in cylinder 21 between the abutment coupling 22 and the ring 60 on the valve-cage 45. This piston 70 is similar in construction to valve-cage 45 excepting however, that it has no outside shoulder as does the valve-cage but is provided with a tubular skirt of predetermined length and slidably fitting cylinder 21. It has an intake, disc-valve 71, a pressure relief valve 72 and springs 73 and 74 normally, yieldably holding said respective valves upon their seats similarly to the corresponding elements of the valve-cage 45. A spring 75 is interposed between the piston 70 and the ring 60, said spring yieldably urging the piston normally to engage the abutment 23 on the coupling ring 22 as shown in Fig. 4.

The rod 26 has a fluid displacement element or piston 80 attached thereto, which piston forms two fluid displacement chambers 81 and 82 within the cylinder. The fluid displacement member or piston 80 is attached to a reduced diameter portion 83 of rod 26. Directly engaging the shoulder 84 on rod 26 is a ring 85 against which one end of sleeve 86 abuts. The other end of said sleeve is engaged by a resilient disc-valve 87 which is also engaged by the piston 80. The piston 80 has a plurality of through passages arranged in two, concentric annular rows, those in the inner row being designated by the numeral 90 and those in the outer row by the numeral 91. Disc-valve 87, seated directly upon the piston 80 normally closes passages 91 and is perforated to maintain passages 90 open. A pressure ring 92 on the disc-valve 87 is engaged by the spring 93, surrounding sleeve 86 and abutting collar 85. This spring 93 reinforces disc-valve 87 normally, yieldably to hold the valve against the piston with a predetermined pressure.

The side of the piston 80 adjacent the cylinder chamber 82 is engaged by a resilient disc-valve 95 of such a diameter that it covers only the passages 90 in the inner annular row, the outer row passages not being affected by said valve 95. Disc-valve 95 has a slot which forms a constantly open orifice 96 of predetermined size. A solid, ring shaped and flexible disc 97 forms a yieldable backing for disc-valve 95 both disc-valve and backing disc being urged upon the piston by the clamping nut 98, threaded to the outer end of the piston rod portion 83 and rigidly holding the entire piston assembly upon the rod 26. The disc-valve 95 is reinforced by a backing ring 99 urged at a predetermined pressure upon said disc-valve 95 by the spring 100 which is interposed between said backing ring 99 and nut 98. Thus it may be seen that piston 80 has valve controlled passages providing for the transfer of fluid from one side of the piston to the other or more particularly between cylinder chambers 81 and 82, as the piston is reciprocated in the cylinder.

Normally the piston 80 is substantially midway between the rod guide 25 and the unattached piston 70, the latter piston 70 normally engaging the abutment 23 within the cylinder as shown in Fig. 4.

The shock absorber of the present invention is primarily adapted for use on a vehicle and is mounted between the sprung mass, the body carrying frame of the vehicle and the unsprung mass, the axle for the wheels of the vehicle. As the shock absorber is expanded or collapsed in response to the relative movements of the frame and axle of the vehicle, fluid is displaced within the shock absorber. Fluid displacement within the shock absorber is restricted and this fluid restriction causes the shock absorber to resist the movements of said frame and axle, the degree of such resistance being in accordance with the amount of restriction to the fluid displacement. In motor driven vehicles which are operated over all kinds of road beds, the shock absorbers preferably offer little or no resistance to movements under certain conditions and under others provide the greatest resistance. When a motor vehicle is operated over a road bed having successive, small humps or obstructions, such a road bed being termed the "washboard type," it is preferable that the shock absorber offers little resistance, thereby permitting the wheel and axle, to which said shock absorber is attached, dance freely and thus substantially freely actuate the shock absorber without appreciably affecting the sprung mass. However where comparatively larger obstructions are met by the vehicle wheels and the amplitude of movements become more extended, then the shock absorber should become effective to control the resultant relative movements between the sprung and unsprung masses of the vehicle and thereby provide a comfortable ride.

Assuming that a motor vehicle equipped with shock absorbers of the present invention, is being driven over a washboard road, the small obstruction, when met by a wheel, will thrust the axle upwardly, moving the cover cap 41 and its engaging cylinder 21 and tube 40 and other elements connected thereto upwardly thereby causing relative movement between the piston 80 and its containing cylinder 20. This is termed the "compression stroke" and for purposes of this description the piston 80 will be referred to as moving downwardly in the cylinder during this cycle of movement. As the piston 80 moves downwardly it exerts pressure upon the fluid in chamber 82 causing said fluid to flow through the constantly open orifice 96 in valve 95, enter and pass through piston passages 90 and the opening in valve 87 into the other cylinder chamber 81. Inasmuch as chamber 81 contains the piston rod 26 and thus cannot receive all of the fluid displaced from chamber 82 which does not contain a rod as does the chamber 81, the fluid displaced by rod 26 will exert a pressure upon the unattached piston 70 urging it downwardly, away from the abutment 23 against the opposing effect of the spring 75. As the unattached piston 70 is pressure moved toward the valve cage 45 at the bottom end of cylinder 21, it exerts a pressure upon the fluid within cylinder portion 21 causing the plug type fluid pressure relief valve 50 to be moved against the opposing effect of the comparatively light spring 53 thereby to move the side opening 52 in said valve outside the confines of the disc valve 48 and thus establish a restricted fluid flow from within the cylinder portion 21, through the disc valve 48 into the space beneath the valve cage 45 which space is in communication with the fluid reservoir 24. The unattached piston 70 will move under the influence of the downwardly moving piston 80 until said unattached piston engages the ring 60 after which continued fluid displacement from chamber 82 will move valve 72 against the opposing effect of spring 74, which is heavier than spring 53 of valve 50, to establish a restricted flow from cylinder portion 82 through the still open valve 50 into the reservoir. The present shock absorber is designed so that substantially one inch of downward travel of piston 80 will move the unattached piston 70 from engagement with the abutment 23 into engagement with the ring 60. Any shorter movement of piston 80 downwardly will not cause the unattached piston to move through its entire range of travel and thus for these shorter movements of piston 80 valve 72 in the unattached piston will remain closed and fluid will not be displaced from the cylinder chamber 82 into the interior of cylinder portion 21 beneath the unattached piston, but from said portion 21 through valve 50 into the reservoir in response to the downward movement of the unattached piston.

When the piston 80 starts to move in the opposite or upward direction, having forced the unattached piston 70 downwardly against the ring 60, said unattached piston, under the effect of spring 75, will follow the upward movement of piston 80 until said unattached piston again engages the abutment 23. During this upward movement of the unattached piston 70, away from the valve cage 45, disc valve 48 on said cage will be lifted against the opposing effect of the comparatively light spring fingers 55, thereby establishing a substantially free flow of fluid from the reservoir 24 into the interior of cylinder portion 21. Continued upward movement of piston 80, after the unattached piston 70 has engaged the abutment 23 will cause the disc-valve 71 to be lifted against the effect of spring fingers 73 thereby to establish a substantially free flow of fluid from the cylinder portion 21 into the cylinder portion 20, the cylinder portion 21 still receiving fluid from the reservoir 24 due to the maintained opening of the disc valve 48 under these conditions.

The flow of fluid from the reservoir 24 into the cylinder portion 20 is necessary because not sufficient fluid is displaced from the rod containing chamber 81 to fill chamber 82 as the piston 80 moves upwardly, thus an amount of fluid substantially equal to that displaced by the piston rod must be provided by the fluid reservoir 24 in order to prevent starvation of the chamber 82.

When the road wheel of the vehicle strikes a larger obstruction and the axle is thrust upwardly more violently and a greater distance than when operating over a washboard type roadbed, the downwardly moving piston 80 will exert a pressure upon the fluid in chamber 82 which cannot be relieved by the orifice 96 alone. For the first one inch travel downwardly of piston 80, the unattached piston 70 is moved from normal position in which it engages abutment 23 as shown in Fig. 4, into the position as shown in Fig. 1 in which said unattached piston engages the ring 60 on valve cage 48. As the piston 80 continues to move downwardly the fluid pressure not relievable by the orifice 96 alone will actuate valve 87 to establish a restricted fluid flow from chamber 82 through piston passages 91 into the chamber 81. Valve 87 is so designed that it will open to relieve fluid pressure within chamber 82 before valve 72 in the unattached piston 70 opens. The fluid displaced by rod 26 will cause valve 72 to open and establish a restricted fluid flow from chamber 82 through valve 50 into the reservoir, valve 50 having been opened as the unattached piston has moved to engage the ring 60.

When piston 80 is moved upwardly in cylinder 20 in response to the rebound movement of the sprung mass, fluid pressure in chamber 81, not being relievable by the orifice 96 will move the valve 95 against the effect of its predetermined spring load, to open passages 90 whereby a restricted fluid flow from chamber 81 past the open valve 95 is established into cylinder chamber 82.

Thus it may be seen that the present invention provides an hydraulic shock absorber capable of offering a predetermined minimum of resistance during a predetermined portion of its range of movement initially in either direction the shock absorber automatically providing increased resistance during the remaining portion of its range of movements in either direction.

While the embodiment of the present invention as herein disclosed, constitutes a preferred form, it is to be understood that other forms might be adopted.

What is claimed is as follows:

1. An hydraulic shock absorber consisting of a cylinder provided with a closure member at each end; a valved piston in said cylinder forming two work chambers therein said piston having a rod slidably extending through the one cylinder closure member; oppositely acting valves in the other cylinder closure member; an unattached piston slidable in the cylinder between the first mentioned piston and the valved cylinder closure member, said unattached piston having oppositely acting valves similarly acting to the valves in said other cylinder closure member; a stationary abutment in the cylinder engageable by the unattached piston for limiting its movement in the cylinder; a spring interposed between the valved closure member and the unattached piston, yieldably urging said unattached piston against the abutment; and a fluid reservoir in communication with the cylinder through the valved closure member.

2. An hydraulic shock absorber consisting of a cylinder; a valved piston in said cylinder, said piston having a rod; a rod guide forming a closure member at one end of the cylinder and slidably supporting the piston rod; two closure members at the other end of the cylinder, each provided with oppositely and similarly acting valves, one of the members being attached to the end of the cylinder, the other member being slidable within the cylinder between the attached member and the piston; abutment means within the cylinder engageable by the slidable closure member for limiting its movement away from the attached member a predetermined distance; a spring interposed between said member yieldably holding the slidable member against the abutment means; and a fluid reservoir in communication with the cylinder through the valved, attached closure member.

3. An hydraulic shock absorber consisting of a main cylinder; a valved piston in said cylinder, said piston having a rod slidably extending through a closure member secured to one end of the cylinder; an abutment ring fitting into the other end of the cylinder inwardly of the end thereof and providing an inner annular shoulder; two substantially identical disc-shaped members each provided with two oppositely and similarly acting fluid flow control devices, one of the disc-shaped members being fixedly attached to the said other end of said cylinder at its outer end, the other of the disc-shaped members being reciprocative within said cylinder between the said one member and the abutment ring which limits the movement of said other member toward the piston; a spring interposed between said member yieldably holding said other member against the abutment ring; and a fluid reservoir communicating with the cylinder through the two valved, disc-shaped members serially in either direction of flow therethrough.

4. A device in accordance with claim 3 in which one fluid flow control device in the disc-shaped member fixed to the cylinder is operative to establish a restricted fluid flow from the interior of the cylinder between said disc-shaped members into the fluid reservoir in response to movement of the reciprocative member in said cylinder as the piston moves toward said reciprocative member and a correspondingly similar device in the reciprocative member is operative to establish a restricted fluid flow from the cylinder between the device and the piston through the device in the fixed member and into the reservoir when said reciprocative disc-shaped member is moved to the limit of its travel relative to the fixed member.

5. A device in accordance with claim 3 in which the fluid flow control devices of each disc-shaped member consist of a spring loaded pressure relief valve operative to establish a restricted fluid flow in one direction through the respective member and a spring loaded fluid replenishing valve operative to establish a substantially unrestricted fluid flow through said member in the opposite direction, the pressure relief valve of the fixed member operating first to establish a restricted flow from the interior of the cylinder below the reciprocative member into the reservoir in response to movement of the reciprocative member under the effect of piston movement toward said member, the pressure relief valve of the reciprocative member being operative to establish a restricted fluid flow from the cylinder through the pressure relief valve in the fixed member into the reservoir when said reciprocative member is moved to the limit of its travel relative to the fixed member, the replenishing valve of the fixed member being operative to establish a substantially free flow of fluid from the reservoir into the cylinder as the reciprocative member is moved to engage the abutment ring while the piston is operated away from the fixed member and the replenishing valve of the reciprocative member becoming effective to establish a flow into the cylinder when the said member engages the abutment ring.

6. An hydraulic shock absorber consisting of a cylinder having a closure member at each end, one closure member being valved with oppositely acting fluid flow control devices; a fluid reservoir in communication with the cylinder through the valved closure member; two valved pistons reciprocative within the cylinder, the one having a rod attached thereto which slidably extends through a cylinder closure member, the other piston being unattached and interposed between said one piston and the valved closure member and urged against a stationary abutment in the cylinder by a spring seated upon the valved closure member, one fluid flow control device of the valved closure member and one similar device of the unattached piston being operative successively in the same direction to establish restricted fluid flow into the reservoir, the other fluid flow control devices of said closure member and unattached piston being operative in the same direction to establish a substantially free flow of fluid from the reservoir into the cylinder.

7. An hydraulic shock absorber consisting of a cylinder having a closure member at each end, one closure member being valved with oppositely acting fluid flow control devices; a fluid reservoir in communication with the cylinder through the valved closure member; two valved pistons reciprocative within the cylinder, the one having a rod attached thereto which slidably extends through a cylinder closure member, and provides means for positively reciprocating said piston in the cylinder, the other being a floating piston between the positively operated piston and the one closure member, and also having fluid flow control devices and being reciprocated in response to reciprocation of the positively actuated piston; abutment means in the cylinder for limiting the movement of the floating piston away from the said one closure member; means yieldably urging said floating piston against said abutment means, the fluid flow control devices of said one closure member and said floating piston being substantially alike and operative to establish restricted fluid flow in one direction through the member and piston supporting them and substantially unrestricted fluid flow in the opposite direction, in response to reciprocation of the positively actuated piston in one direction or the other respectively.

8. An hydraulic shock absorber consisting of a cylinder provided with a closure member at each end, one of said closure members having oppositely acting valved passages; a fluid reservoir in communication with the cylinder through the valved closure member; a positively actuated piston having passages providing for the transfer of fluid from one side thereof to the other, said piston having an attached rod extending slidably through the other closure member; a fluid flow control valve on each side of the piston for controlling the flow of fluid through said piston in either direction, the valve on the side of the piston more adjacent the valved closure member having a constantly open orifice; an abutment member within the cylinder; an unattached piston reciprocative within the cylinder between the abutment and the valved closure member; a spring interposed between the unattached piston and said valved closure member, yieldably holding the unattached piston against the abutment; a pressure relief valve in the one closure member, operative in response to movement of the unattached piston to establish a flow of fluid from the cylinder into the reservoir; a similar pressure relief valve in the unattached piston operative when said unattached piston engages the valved closure member, to establish a restricted fluid flow from the cylinder through the relief valve of the closure member into the reservoir; a replenishing valve in the closure member operative to establish a substantially unrestricted flow of fluid from the reservoir into the cylinder chamber between said valved closure member and the unattached piston as said piston moves toward the abutment; and a similar replenishing valve in the unattached piston for establishing a flow of fluid from the chamber between said unattached piston and the valved closure member when said unattached piston engages the abutment and the positively actuated piston is moving away from the unattached piston.

9. An hydraulic shock absorber consisting of a fluid reservoir; a cylinder provided with a closure member at each end, one closure member being provided with oppositely acting, valved passages; two pistons reciprocative in the cylinder, one being positively actuated by a rod slidably extending through the other closure member, the other piston being unattached and movable in response to movements of the positively actuated piston; an abutment in the cylinder between the two pistons limiting the movement of the unattached piston toward the other piston; a spring interposed between the unattached piston and the valved closure member, normally yieldably holding said unattached piston against the abutment, replenishing valves in the valved closure member and unattached piston, operative successively in response to movement of the positively actuated piston away from the unattached piston, to establish a substantially unrestricted flow of fluid from the reservoir into the cylinder; and fluid flow restricting valves in the said valved closure member and unattached piston operative successively, in response to movement of the positively actuated piston toward said unattached piston, to establish restricted fluid flow from the cylinder into the reservoir, the valve in the valved closure member controlling the fluid flow until the unattached piston moves to the limit of its travel toward said valved closure member after which the valve of the unattached piston controls fluid flow.

10. An hydraulic shock absorber consisting of a cylinder having a closure member at each end, one of which has oppositely acting valved passages providing communication with a fluid reservoir; a reciprocative valved piston forming two fluid displacement chambers within said cylinder, said piston having a rod extending slidably through the other closure member; an abutment member in the cylinder between the piston and valved closure member; and a spring loaded valved partition slidable in the cylinder between the abutment and said valved closure member having oppositely acting valved passages similarly acting to those in said valved closure member and providing fluid flow therethrough in either of opposite directions, the range of movement of said partition being a predetermined fraction of the range of movement of the piston and providing thereby free movement of said piston without discharge of fluid from the cylinder between said piston and said partition.

11. A shock absorber in accordance with claim 10 in which the said one closure member and the partition are each provided with substantially similar, oppositely acting valves one of each restricts fluid flow in one direction through the respective member carrying the same, the valve in the partition to a slightly greater degree than the similar valve in the closure member, the other valves establishing a substantially free flow of fluid in the same direction through the respective members carrying the same.

12. A hydraulic shock absorber consisting of a cylinder provided with a closure member at each end, one of said closure members being valved with oppositely acting fluid flow control devices for controlling fluid flow through said closure member in both directions; a fluid reservoir communicating with said cylinder through said valved closure member; a positively actuated piston in said cylinder, provided with oppositely acting valved fluid passages and having a rod attached thereto which slidably extends through the other closure member; an abutment within the cylinder; a free piston yieldably held normally against said abutment and having oppositely acting valved passages, said free piston being movable through a predetermined range of movement as the positively actuated piston is moved in one direction during which time the one fluid flow control device in the closure member is rendered operative to establish a controlled fluid flow from the cylinder, the one valve passage in the free piston joining the valve of the valved closure member to control fluid flow from the cylinder when the positively actuated piston has been operated through a predetermined initial range of movement and the free piston has been moved through its predetermined range of movement away from said abutment.

13. An hydraulic shock absorber consisting of a main cylinder; a valved piston in said cylinder, providing for flow of fluid therethrough to opposite sides thereof; said piston having a rod slidably extending through a closure member secured to one end of the cylinder; a valved closure member secured to the opposite end of said cylinder providing for flow of fluid therethrough to opposite sides thereof; a valved partition slidable in said cylinder between said piston and said first mentioned closure member and providing for flow of fluid therethrough to opposite sides thereof, resiliently acting means engaging said partition for positioning thereof in spaced relationship to first mentioned closure member and providing for resilient movement toward the same; said valved closure member having the valving thereof proportioned to the valving of said partition to open prior to opening of the valving in said partition upon movement of said piston toward said valved closure member, whereby to provide for movement of said partition toward said valved closure member, abutment means engaged by said partition on movement thereof toward said valved closure member to limit the said movement, said valving of said partition opening upon stopping of movement of said partition providing for flow of fluid thereafter through said partition and said valved closure member concurrently during continued movement of said piston toward said valved closure member, and a fluid reservoir communicating with the interior of the cylinder through said valved closure member and said partition.

References Cited in the file of this patent
UNITED STATES PATENTS

| Number | Name | Date |
|---|---|---|
| 2,038,032 | Flynn | Apr. 21, 1936 |
| 2,519,605 | Rossman | Aug. 22, 1950 |